US012346124B2

(12) United States Patent
Chen et al.

(10) Patent No.: US 12,346,124 B2
(45) Date of Patent: Jul. 1, 2025

(54) METHOD FOR CONTROLLING MOBILE ROBOTS

(71) Applicant: URSrobot AI Inc., Taipei (TW)

(72) Inventors: Chien-Tung Chen, Taipei (TW);
Chung-Hou Wu, Taipei (TW);
Chao-Cheng Chen, Taipei (TW);
Wen-Wei Chiang, Taipei (TW); Yi-Jin Lin, Taipei (TW)

(73) Assignee: URSROBOT AI INC., Taipei (TW)

( * ) Notice: Subject to any disclaimer, the term of this patent is extended or adjusted under 35 U.S.C. 154(b) by 79 days.

(21) Appl. No.: 18/362,175

(22) Filed: Jul. 31, 2023

(65) Prior Publication Data

US 2024/0045442 A1 Feb. 8, 2024

(30) Foreign Application Priority Data

Aug. 3, 2022 (TW) .................................. 111129195

(51) Int. Cl.
*G05D 1/00* (2024.01)
*G05D 1/644* (2024.01)
*G05D 1/648* (2024.01)
*G05D 1/698* (2024.01)

(52) U.S. Cl.
CPC ......... *G05D 1/0287* (2013.01); *G05D 1/0219* (2013.01)

(58) Field of Classification Search
CPC ............... G05D 1/0287; G05D 1/0219; G05D 2105/15; G05D 2107/23; G05D 2109/10; G05D 1/644; G05D 1/6484; G05D 1/6987; G05D 1/021; G05D 1/0212; G05D 1/0276; G05D 2105/40; G05D 2105/10; B25J 9/00; B25J 9/16; B25J 9/0003; B25J 9/12; B25J 9/123; B25J 9/1656; B25J 9/1661; B25J 9/1664; B25J 9/1682; B25J 11/008; B25J 13/006; A47L 2201/04; A47L 2201/06
See application file for complete search history.

(56) References Cited

U.S. PATENT DOCUMENTS

| 12,025,987 B2* | 7/2024 | Kolling .................. G05D 1/648 |
| 2017/0336787 A1* | 11/2017 | Pichlmaier ........... A01B 69/008 |
| 2018/0157266 A1* | 6/2018 | Xie ........................ G05D 1/0297 |
| 2019/0061166 A1* | 2/2019 | Dai ........................ B25J 19/005 |

(Continued)

*Primary Examiner* — Adam R Mott
*Assistant Examiner* — Byron Xavier Kasper
(74) *Attorney, Agent, or Firm* — Birch, Stewart, Kolasch & Birch, LLP (57) ABSTRACT

A method for controlling a plurality of mobile robots is to be implemented by a server that communicates with the plurality of mobile robots and a communication device. The server stores a predetermined working route related to a target area. The method includes steps of: receiving a working instruction from the communication device, the working instruction including area information related to the target area and an input quantity of mobile robots; in response to receipt of the working instruction, dividing the predetermined working route into a plurality of sub-routes, wherein a quantity of the sub-routes equals the input quantity of mobile robots; and sending the sub-routes respectively to a plurality of selected robots that are selected from among the plurality of mobile robots to make the selected robots cooperatively implement a task on the target area by moving along the sub-routes, respectively.

8 Claims, 6 Drawing Sheets

(56) References Cited

U.S. PATENT DOCUMENTS

| | | | |
|---|---|---|---|
| 2019/0248002 A1* | 8/2019 | Deyle | B25J 19/023 |
| 2020/0019156 A1* | 1/2020 | Drew | A47L 9/2826 |
| 2022/0035379 A1* | 2/2022 | Xu | G05B 6/02 |
| 2023/0084829 A1* | 3/2023 | Sung | A47L 9/009 |
| | | | 134/6 |
| 2023/0371769 A1* | 11/2023 | Kwak | B25J 9/16 |
| 2024/0345599 A1* | 10/2024 | Jonsson | G05D 1/646 |

* cited by examiner

METHOD FOR CONTROLLING MOBILE ROBOTS

CROSS-REFERENCE TO RELATED APPLICATION

This application claims priority to Taiwanese Invention Patent Application No. 111129195, filed on Aug. 3, 2022.

FIELD

The disclosure relates to a method for controlling a plurality of mobile robots.

BACKGROUND

Conventionally, when multiple mobile robots (for example, grass mowing robots) are used to cooperatively work on a large space, a user would visually divide the space into multiple sections, and control the mobile robots to work on the sections, respectively.

However, when the space has an irregular shape, the user may need to spend more time on dividing the space, and the mobile robots may not work for the same amount of time as the sections may not be equal in size.

SUMMARY

Therefore, an object of the disclosure is to provide a method for controlling a plurality of mobile robots that can alleviate at least one of the drawbacks of the prior art.

According to the disclosure, the method is to be implemented by a server that communicates with the plurality of mobile robots and a communication device. The server stores a predetermined working route related to a target area.

The method includes steps of: receiving a working instruction from the communication device, the working instruction including area information related to the target area and an input quantity of mobile robots; in response to receipt of the working instruction, dividing the predetermined working route that is related to the target area into a plurality of sub-routes, wherein a quantity of the sub-routes equals the input quantity of mobile robots; and sending the sub-routes respectively to a plurality of selected robots selected from among the plurality of mobile robots to make the selected robots cooperatively implement a task on the target area by moving along the sub-routes, respectively.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
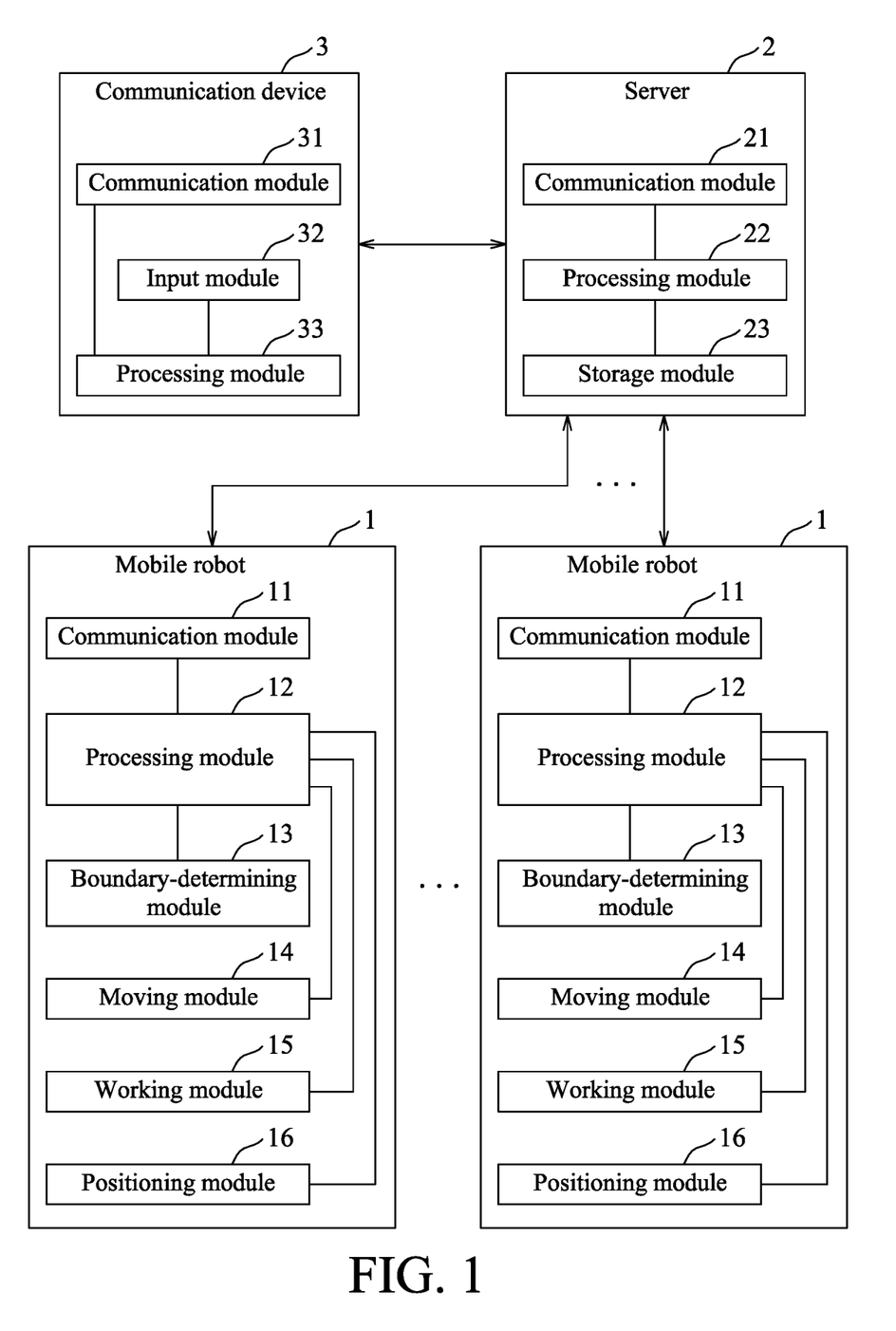
FIG. 1 is a block diagram of a system that includes a plurality of mobile robots, a communication device, and a server and that implements an embodiment of a method for controlling the plurality of mobile robots according to the disclosure.

Referring to FIG. 1, a block diagram of a system including a plurality of mobile robots 1, a server 2 and a communication device 3 is illustrated. The server 2 implements a method for controlling the plurality of mobile robots 1. The server 2 communicates with the plurality of mobile robots 1 and the communication device 3 through, for example, the Internet or other types of wireless networks (e.g., a wireless personal area network, a wireless local area network, a cellular network, etc.).

Each of the mobile robots 1 includes a communication module 11, a processing module 12, a boundary-determining module 13, a moving module 14, a working module 15 and a positioning module 16. In this embodiment, the mobile robots 1 are grass mowing robots, and the working module 15 of each mobile robot 1 is to perform the grass mowing task; but this disclosure is not limited to such.

The communication module 11 may be a wireless communication module using a wireless technology of Wi-Fi to communicate with the server 2 over the Internet or the wireless network.

The processing module 12 is electrically connected to the communication module 11, the boundary-determining module 13, the moving module 14, the working module 15 and the positioning module 16. The processing module 12 may be embodied using one or more of a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The boundary-determining module 13 is configured to perform boundary detection in a working area and to generate a boundary data piece that indicates a boundary of the working area. For example, the boundary module 13 may include one or more sensors (e.g., an infrared sensor, a radar, an ultrasonic sensor, etc.) that are used to perform boundary detection. The working area is where the mobile robots 1 will be working (e.g., grass mowing).

The moving module 14 may include multiple wheels, and a motor that drives the wheels to make the mobile robot 1 move.

The working module 15, in this embodiment, includes a blade disk for mowing grass, and a motor for driving the blade disk to rotate.

The positioning module 16 is configured to continuously detect a current position of the mobile robot 1. The positioning module 16 may be an electronic hardware module that supports real-time kinematic (RTK) or the Global Positioning System (GPS).

The communication device 3 may be a smartphone, a tablet computer, etc., and includes a communication module 31, an input module 32, and a processing module 33.

The communication module 31 is configured to communicate with the server 2 over the Internet or the wireless network, and may be a short-range wireless communication module using a wireless technology of Wi-Fi, or a mobile communication module supporting telecommunication using Long-Term Evolution (LTE), the third generation (3G), the fourth generation (4G) or fifth generation (5G) of wireless mobile telecommunications technology, or the like.

The input module 32 may be a touch panel such that a user of the communication device 3 may use the input module 32 to input data through a graphic user interface of the communication device 3.

The processing module 33 is electrically connected to the communication module 31 and the input module 32. When the data is input, the processing module 33 may send the data to the server 2 through the communication module 31. The processing module 33 may be embodied using one or more of a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The server 2 includes a communication module 21, a processing module 22 and a storage module 23.

The communication module 21 may be a network interface controller (NIC) to communicate with the mobile robots 1 and the communication device 3 over the Internet or the wireless network.

The processing module 22 is electrically connected to the communication module 21 and the storage module 23. The processing module 22 may be embodied using one or more of a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The storage module 23 stores a plurality of boundary data pieces that respectively correspond to a plurality of working areas, and a plurality of route data pieces that respectively correspond to the working areas. For each of the working areas, one or more of the mobile robots 1 will be dispatched to work in the working area. The boundary data pieces are generated by one of the mobile robots 1 (hereinafter referred to as "bounding robot") and received from the bounding robot 1 through the communication module 21 of the server 2. The route data pieces are generated by the processing module 23 based on the boundary data pieces, respectively.

More specifically, for a working area, when the processing module 22 receives a boundary-generating instruction from the communication device 3, the processing module 22 sends a signal to the bounding robot 1 to make the bounding robot 1 determine a plurality of boundary coordinate sets that together define a boundary of the working area and send the boundary coordinate sets to the processing module 22 of the server 2 through the communication module 11 of the bounding robot 1. When the processing module 22 receives the boundary coordinate sets from the bounding robot 1, the processing module 22 stores the boundary coordinate sets in the storage module 23 as a boundary data piece that corresponds to the working area. Furthermore, for the working area, the processing module 22 generates the route data piece based on the boundary data piece and stores the route data piece in the storage module 23, wherein the route data piece defines a route that is to be followed by the corresponding one or more mobile robots 1 when working in the working area. In this embodiment, the boundary data pieces and the route data pieces for multiple working areas are stored in a lookup table of the storage module 23. Each column of the lookup table includes a reference number of one of the working areas, one of the boundary data pieces related to the one of the working areas, one of the route data pieces related to the one of the working areas.

Figure 2:
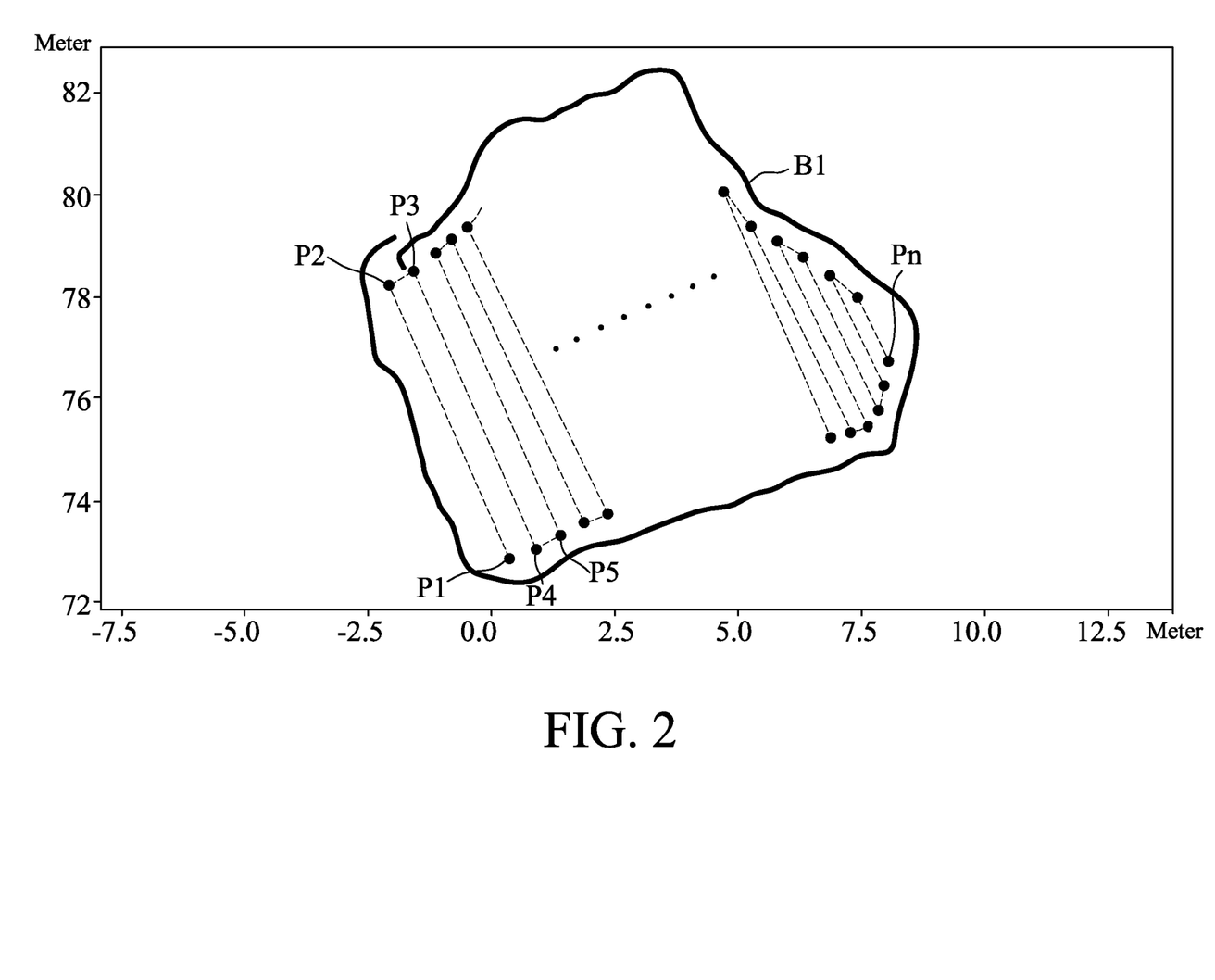
FIG. 2 is a schematic diagram illustrating a boundary data piece and a route data piece according to an embodiment of the disclosure.

Referring to FIG. 2, an example of a boundary data piece and an example of the corresponding route data piece are illustrated. The boundary data piece is constituted by a plurality of boundary coordinates sets, and the boundary coordinate sets are sequentially connected to form a boundary B1 of the corresponding working area. The route data piece has a plurality of route coordinate sets (P1 to Pn illustrated in FIG. 2 show the route coordinate sets).

Figure 3:
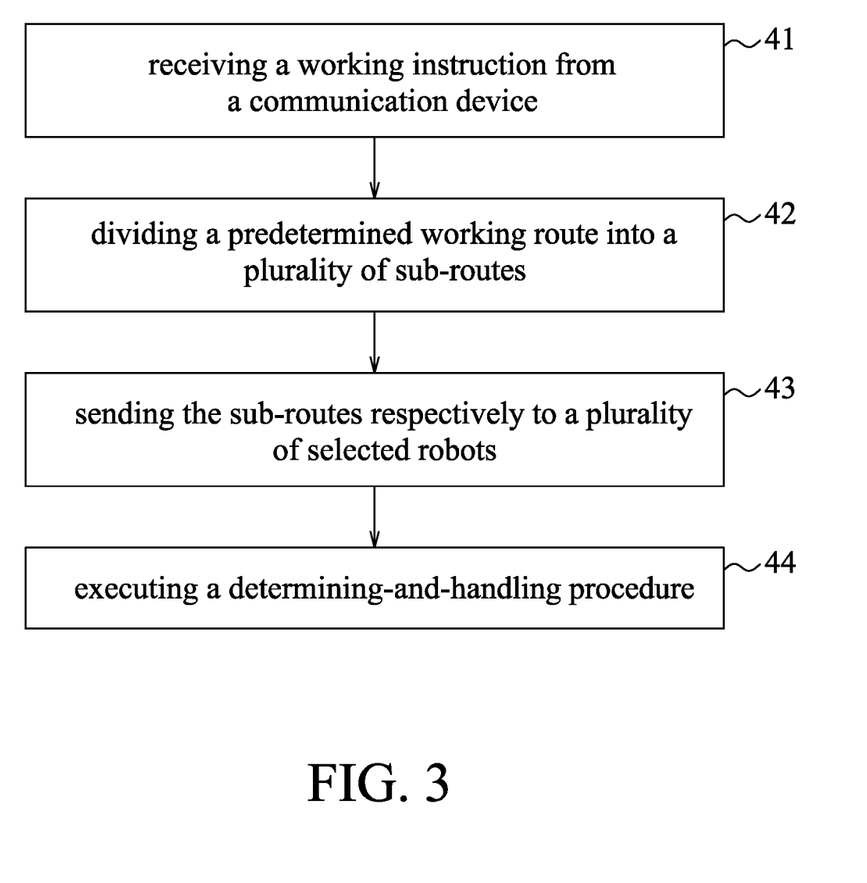
FIG. 3 is a flowchart illustrating the method according to an embodiment of the disclosure.

Referring to FIG. 3, the method according to the embodiment of the disclosure is illustrated. The method includes the following steps that are to be performed by the processing module 22 of the server 2.

In Step 41, the processing module 22 receives a working instruction from the communication device 3. The working instruction includes an area information related to one of the working areas (hereinafter referred to as "the target area") and an input quantity of mobile robots. In this embodiment, the area information is the reference number of the target area, which may be used find the corresponding boundary data pieces and the corresponding route data piece from the lookup table stored in the storage module 23. The input quantity of mobile robots may be determined by the user and input using the communication device 3, wherein the user's determination may be made with reference to a proposed quantity of mobile robots that is suitable for performing a task on the target area. More specifically, before Step 41, the processing module 22 may receive setting information from the communication device 3. The setting information includes the area information and time-related information. The time-related information may be a preferred working time length or a preferred end time relating to the task on the target area. Then, the processing module 22 generates the proposed quantity of mobile robots based on a predetermined movement speed of the mobile robots 1 (hereinafter referred to as "predetermined robot speed") and the setting information by, for example, retrieving one of the route data pieces that corresponds to the target area (hereinafter referred to as "predetermined working route") from the storage module 23 using the area information in the setting information, obtaining a route length of the predetermined working route based on the route coordinate sets of the predetermined working route, obtaining a total working time with respect to the predetermined working route based on the predetermined robot speed and the route length, and generating the proposed quantity of mobile robots based on the predetermined robot speed and the time-related information in the setting information. When the time-related information is the preferred end time, the processing module 22 further generates the proposed quantity of mobile robots based on a current time. The processing module 22 calculates the proposed quantity of mobile robots as a smallest integer not less than a quotient obtained from dividing the total working time by a difference between the preferred end time and the current time. After the proposed quantity of mobile robots is generated, the processing module 22 sends the proposed quantity of mobile robots to the communication device 3 for the user's reference when determining the input quantity of mobile robots. The predetermined movement speed is a speed of each mobile robot 1 that is working and moving in the working area, and for example, ranges from 50 cm/s to 75 cm/s in some embodiments where each mobile robot 1 is a grass mowing robot, and may be faster in other embodiments where each mobile robot 1 is, for example, a drone for spraying pesticides.

In Step 42, in response to receipt of the working instruction, the processing module 22 divides the predetermined working route into a plurality of sub-routes. A quantity of the sub-routes equals the input quantity of mobile robots.

Figure 4:
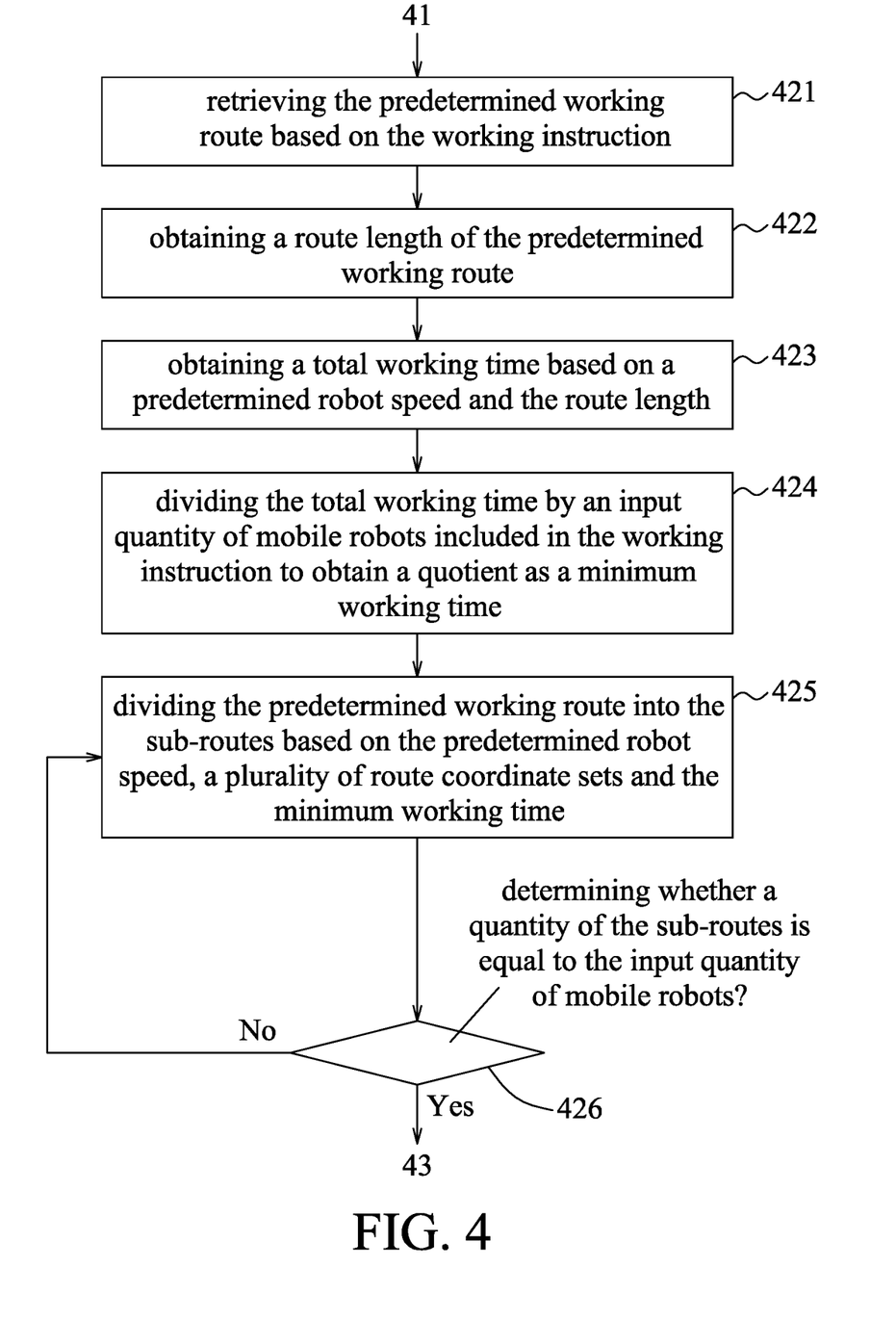
FIG. 4 is a flowchart illustrating sub-steps of a step of dividing a predetermined working route according to an embodiment of the disclosure.

More specifically, further referring to FIG. 4, the Step 42 includes Sub-steps 421 to 426.

In Sub-step 421, the processing module 22 retrieves the predetermined working route based on the working instruction. In this embodiment, the server 2 uses the area information in the working instruction to retrieve the predetermined working route from the lookup table.

In Sub-step 422, the processing module 22 obtains the route length of the predetermined working route based on the route coordinate sets of the predetermined working route.

In Sub-step 423, the processing module 22 obtains the total working time for performing the task based on the predetermined robot speed and the route length.

In Sub-step 424, the processing module 22 divides the total working time by the input quantity of mobile robots to obtain a quotient which is to serve as a minimum working time.

In Sub-step 425, the processing module 22 divides the predetermined working route into the sub-routes based on the predetermined robot speed, the route coordinate sets of the predetermined working route and the minimum working time. Each of the sub-routes has a part of the route coordinate sets of the predetermined working route.

For example, a quantity of the route coordinate sets of the predetermined working route is equal to a number (N). When the processing module 22 determines that a quotient of dividing a route length from a first one of the route coordinate sets to an $(i-1)^{th}$ one (i is an integer ranging from two to N) of the route coordinate sets by the predetermined robot speed is smaller than the minimum working time and a quotient of dividing a route length from the first one of the route coordinate sets to an $i^{th}$ one of the route coordinate sets by the predetermined robot speed is greater than or equal to the minimum working time, the processing module 22 uses the first one of the route coordinate sets to the $i^{th}$ one of the route coordinate sets to define a sub-route. Then, when the processing module 22 determines that a quotient of dividing a route length from the $i^{th}$ one of the route coordinate sets to a $(j-1)^{th}$ one (j is an integer ranging from (i+1) to N) of the route coordinate sets by the predetermined robot speed is smaller than the minimum working time and a quotient of dividing a route length from the $i^{th}$ one of the route coordinate sets to a $j^{th}$ one of the route coordinate sets by the predetermined robot speed is greater than or equal to the minimum working time, the processing module 22 uses the $i^{th}$ one of the route coordinate sets to the $j^{th}$ one of the route coordinate sets to define another sub-route. This process is reiterated until a quotient of dividing a route length relating to remaining one(s) of the route coordinate sets that has/have not been assigned to any one of the sub-routes, which have already been determined, by the predetermined robot speed is smaller than the minimum working time, where the processing module 22 uses the remaining one(s) of the route coordinate sets and the immediately previous one of the route coordinate sets to define a last sub-route, and then the flow goes to Sub-step 426.

An example where the quantity of the route coordinate sets is twenty will be described. The processing module 22 determines that a quotient of dividing a route length from the first route coordinate set to the sixth route coordinate set by the predetermined robot speed is smaller than the minimum working time and a quotient of dividing a route length from the first route coordinate set to the seventh route coordinate set by the predetermined robot speed is larger than the minimum working time, and thus the processing module 22 uses the first route coordinate set to the seventh route coordinate set to define a first sub-route. Then, the processing module 22 determines that a quotient of dividing a route length from the seventh route coordinate set to the tenth route coordinate set by the predetermined robot speed is equal to the minimum working time, and so the processing module 22 uses the seventh route coordinate set to the tenth route coordinate set to define a second sub-route. Then, the processing module 22 determines that a quotient of dividing a route length from the tenth route coordinate set to the twentieth route coordinate set (i.e., the last route coordinate set) by the predetermined robot speed is smaller the minimum working time, and thus the processing module 22 uses the tenth route coordinate set to the twentieth route coordinate set to define a last sub-route, at which point all sub-routes have been determined, and the flow goes to Sub-step 426.

In Sub-step 426, the processing module 22 determines whether the quantity of the sub-routes is equal to the input quantity of mobile robots. When the determination is affirmative, the flow goes to Step 43; otherwise the flow repeats Sub-steps 425 to 426.

In Step 43, the processing module 22 sends the sub-routes respectively to a plurality of selected robots that are selected from among the plurality of the mobile robots 1 to make the selected robots cooperatively perform the task on the target area by moving along the sub-routes, respectively. In this embodiment, the selected robots are selected by the user using the communication device 3, and accordingly the working instruction further includes information indicating the selected robots (e.g., identifiers respectively of the selected robots) and a quantity of the selected robots equals the input quantity of mobile robots. In other embodiments, the selected robots may be selected by the server 2 randomly according to the input quantity of mobile robots. It should be noted that, by virtue of implementing Sub-steps 425 and 426, it can be ensured that each of the selected robots is assigned a respective one of the sub-routes.

Figure 5:
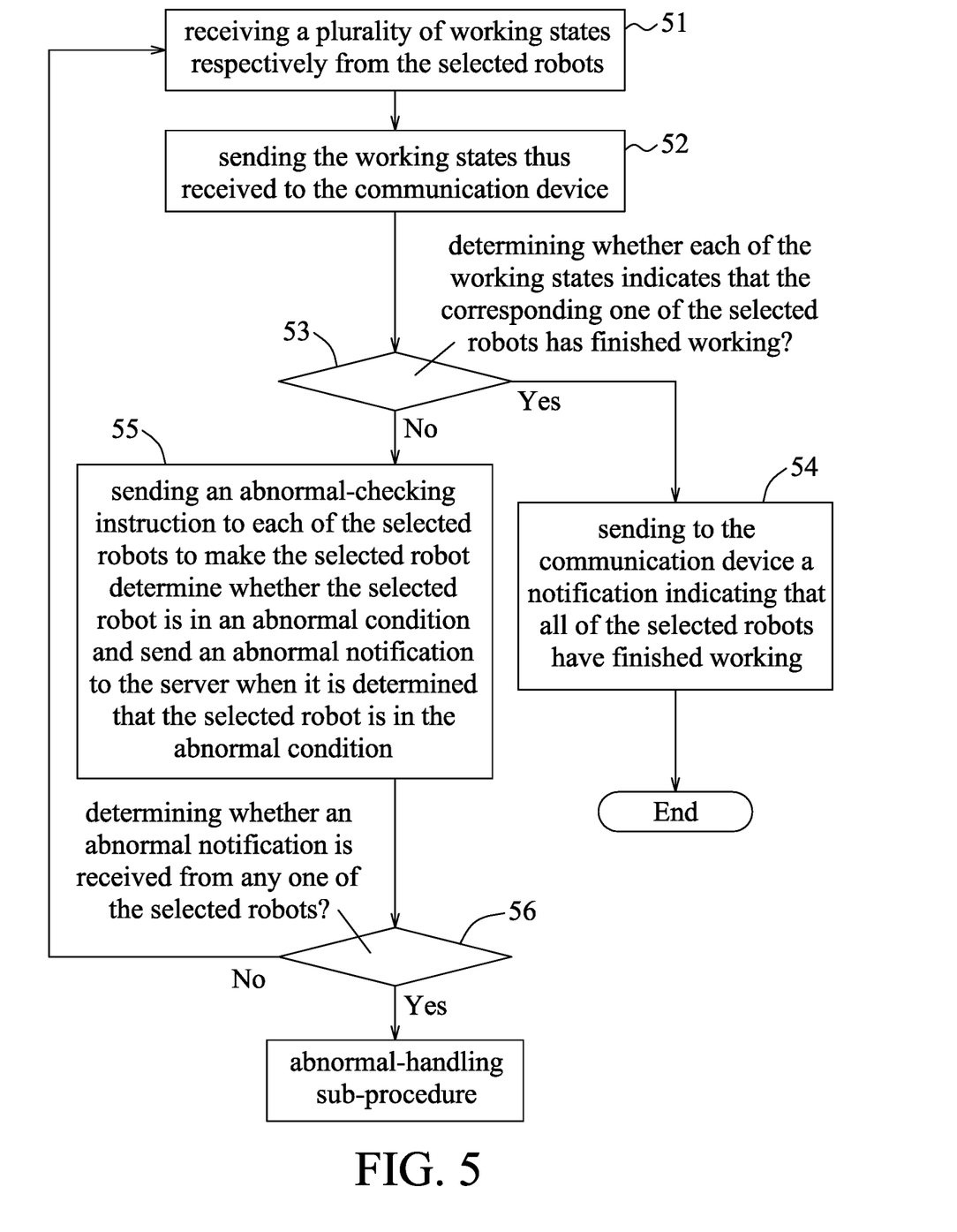
FIG. 5 is a flowchart illustrating a determining-and-handling procedure according to an embodiment of the disclosure.

In Step 44, the processing module 22 executes a determining-and-handling procedure. Referring to FIG. 5, the determining-and-handling procedure includes Steps 51 to 56.

In Step 51, the processing module 22 receives a plurality of working states respectively from the selected robots, where the working state of a robot indicates where the robot is at in terms of working along the corresponding sub-route.

In Step 52, the processing module 22 sends the working states thus received to the communication device 3 to make the communication device 3 display the working states on a display screen (not shown) of the communication device 3.

In Step 53, the processing module 22 determines whether every single one of the working states indicates that the corresponding one of the selected robots has finished working along the corresponding one of the sub-routes. When the determination is affirmative, the flow goes to Step 54; otherwise, the flow goes to Step 55.

In Step 54, the processing module 22 sends to the communication device 3 a notification indicating that all of the selected robots have finished working and the flow terminates.

In Step 55, the processing module 22 sends an abnormal-checking instruction to each of the selected robots to make the processing module 12 of the selected robot determine whether the selected robot is in an abnormal condition. When it is determined that the selected robot is in the abnormal condition, the processing module 12 of the selected robot sends an abnormal notification indicating that the selected robot is in the abnormal condition to the server 2.

More specifically, in this embodiment, for each of the selected robots, upon receiving the abnormal-checking instruction, when the selected robot is moving from one of the route coordinate sets that belongs to the corresponding one of the sub-routes to a next one of the route coordinate sets that belongs to the corresponding one of the sub-routes and that is next to the one of the route coordinate sets, the processing module 12 of the selected robot determines whether the selected robot is at the next one of the route coordinate sets based on a positioning result of the positioning module 16. When it is determined that the selected robot is not at the next one of the route coordinate sets within a threshold time period, the processing module 12 of the selected robot determines that the selected robot is in the abnormal condition (i.e., the selected robot may run out of battery or may be broken or malfunctioning, making the selected robot unable to move to the next one of the route coordinate sets) and sends the abnormal notification to the server 2. The threshold time period is a product of a tolerance ratio that is slightly greater than one and a quotient that is obtained by dividing a route length from the one of the route coordinate sets to the next one of the route coordinate sets by the predetermined robot speed.

In Step 56, the processing module 22 determines whether an abnormal notification is received from any one of the selected robots. When it is determined that at least one abnormal notification is received from at least one of the selected robots (hereinafter referred to as "abnormal robot(s)"), the processing module 22 executes an abnormal-handling sub-procedure; otherwise, the flow repeats the determining-and-handling procedure. It should be noted that the server 2 may receive multiple abnormal notifications; that is to say, one or more mobile robots may be in the abnormal condition at the same time.

Figure 6:
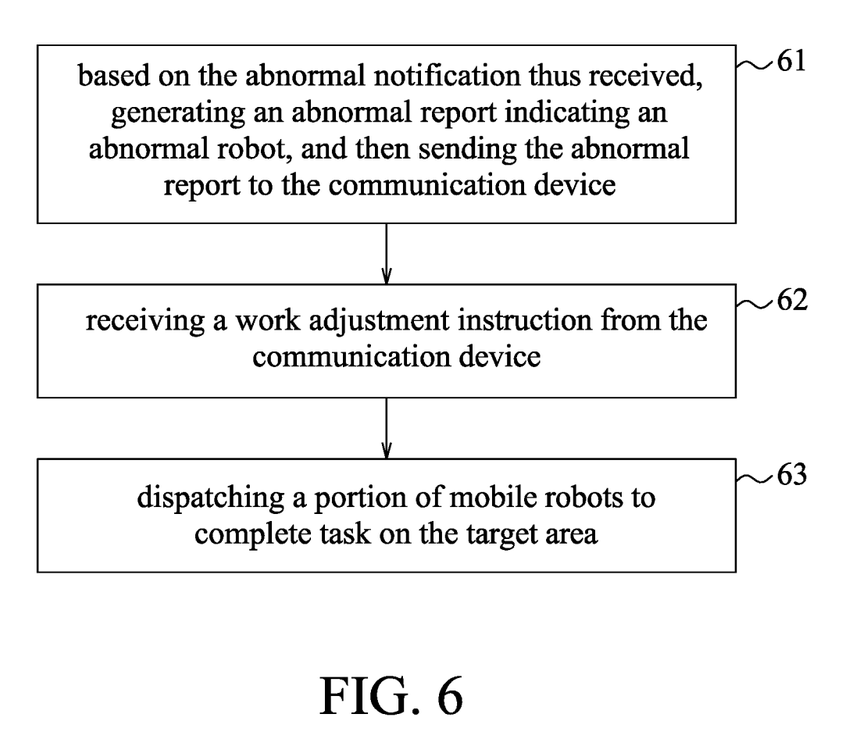
FIG. 6 is a flowchart illustrating an abnormal-handling sub-procedure according to an embodiment of the disclosure.

Referring to FIG. 6, the abnormal-handling sub-procedure includes Steps 61 to 63.

In Step 61, the processing module 22, based on the abnormal notification thus received, generates an abnormal report indicating the abnormal robot, and then sends the abnormal report to the communication device 3 to make the communication device 3 display the abnormal report on the display screen thereof.

In Step 62, the processing module 22 receives a work adjustment instruction from the communication device 3. The work adjustment instruction is generated by the user using the communication device 3 with reference to the abnormal report.

In Step 63, the processing module 22 dispatches a portion of the mobile robots 1 to complete the task on the target area.

More specifically, in one example, when there is one abnormal robot, the work adjustment instruction indicates adding another one of the mobile robots 1 in addition to the selected robots to complete the task, and Step 63 includes: selecting an additional robot from among the mobile robots 1 other than the selected robots according to the working adjustment instruction; sending to the additional robot an adjusted route that is an uncompleted portion of one of the sub-routes which was sent to the abnormal robot, so as to make the additional robot carry out the work left off by the abnormal robot and continue implementing the task on the target area together with the other selected robots by moving along the adjusted route; and repeating the determining-and-handling procedure for the additional robot and the selected robots except the abnormal robot. It should be noted that the processing module 22 may select multiple additional robots, and the uncompleted portion of the one of the sub-routes may be divided into multiple adjusted routes for the additional robots.

In another example, the working adjustment instruction indicates re-dividing an uncompleted portion of the predetermined working route that has not been passed by the selected robots, and Step 63 includes re-dividing the uncompleted portion of the predetermined working route into a plurality of adjusted sub-routes according to the working adjustment instruction, sending the adjusted sub-routes respectively to the selected robots except the abnormal robot, and repeating the determining-and-handling procedure for the selected robots except the abnormal robot. The quantity of the adjusted sub-routes is equal to the input quantity of mobile robots minus a number of the abnormal notification(s) thus received (i.e., the quantity of the abnormal robot(s)).

To sum up, the method of the disclosure divides the predetermined working route into sub-routes quickly and efficiently, and is unaffected by the shape of the target area. Furthermore, route lengths of the sub-routes do not differ greatly such that working times respectively of the selected robots may be close to each other. In addition, the user may check working states of the selected robots through the communication device 3 and make proper adjustment when one of the selected robots is in the abnormal condition.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or

What is claimed is:

1. A method for controlling a plurality of mobile robots, to be implemented by a server that communicates with the plurality of mobile robots and a communication device, the server storing a predetermined working route related to a target area, the method comprising steps of:
receiving a working instruction from the communication device, the working instruction including area information related to the target area and an input quantity of mobile robots;
in response to receipt of the working instruction, dividing the predetermined working route that is related to the target area into a plurality of sub-routes, wherein a quantity of the sub-routes equals the input quantity of mobile robots;
sending the sub-routes respectively to a plurality of selected robots selected from among the plurality of mobile robots to make the selected robots cooperatively implement a task on the target area by moving along the sub-routes, respectively; and
after sending the sub-routes respectively to the plurality of selected robots, implementing a determining-and-handling procedure,
wherein the determining-and-handling procedure includes steps of
receiving a plurality of working states respectively from the selected robots;
determining whether each of the working states indicates that the corresponding one of the selected robots has finished working along the corresponding one of the sub-routes;
when it is determined that each of the working states indicates that the corresponding one of the selected robots has finished working, sending to the communication device a notification indicating that all of the selected robots have finished working;
when it is determined that one of the working states does not indicate that the corresponding one of the selected robots has finished working, sending an abnormal-checking instruction to each of the selected robots to make the selected robot determine whether the selected robot is in an abnormal condition and send an abnormal notification indicating that the selected robot is in the abnormal condition to the server when it is determined that the selected robot is in the abnormal condition;
determining whether an abnormal notification is received from any one of the selected robots; and
when it is determined that an abnormal notification is received from one of the selected robots, executing an abnormal-handling sub-procedure,
wherein the abnormal-handling sub-procedure includes steps of based on the abnormal notification thus received, generating an abnormal report indicating an abnormal one of the selected robots that is a source of the abnormal notification thus received, and then sending the abnormal report to the communication device;
receiving a working adjustment instruction from the communication device, the working adjustment instruction being generated by a user using the communication device with reference to the abnormal report; and
according to the working adjustment instruction, dispatching a portion of the mobile robots to complete the task on the target area,
wherein, in the step of receiving a working adjustment instruction, the working adjustment instruction indicates adding another one of the mobile robots in addition to the selected robots for completing the task, and
wherein the step of dispatching a portion of the mobile robots to complete the task includes selecting an additional robot from among the mobile robots other than the selected robots according to the working adjustment instruction, sending to the additional robot an adjusted route that is an uncompleted portion of one of the sub-routes which was sent to the abnormal one of the selected robots to make the additional robot continue implementing the task together with the selected robots except the abnormal one of the selected robots by moving along the adjusted route, and repeating the determining-and-handling procedure for the additional robot and the selected robots except the abnormal one of the selected robots.

2. The method as claimed in claim 1, the predetermined working route having a plurality of route coordinate sets, wherein the step of dividing the predetermined working route into a plurality of sub-routes includes sub-steps of:
retrieving the predetermined working route based on the working instruction;
obtaining a total working time for the task based on a predetermined robot speed;
dividing the total working time by the input quantity of mobile robots to obtain a minimum working time; and
dividing the predetermined working route into the sub-routes based on the predetermined robot speed, the route coordinate sets of the predetermined working route and the minimum working time, each of the sub-routes having a part of the route coordinate sets of the predetermined working route.

3. The method as claimed in claim 2, wherein the sub-step of obtaining a total working time includes obtaining a route length of the predetermined working route based on the route coordinate sets, and obtaining the total working time based on the predetermined robot speed and the route length.

4. The method as claimed in claim 1, further comprising, before the step of receiving a working instruction, steps of:
receiving setting information from the communication device, the setting information including the area information and time-related information;
generating a proposed quantity of mobile robots that is suitable for the task on the target area based on a predetermined robot speed and the setting information; and
sending the proposed quantity of mobile robots to the communication device.

5. The method as claimed in claim 4, the predetermined working route having a plurality of route coordinate sets, wherein:
in the step of receiving setting information, the time-related information is a preferred end time of the task on the target area,
the step of obtaining a proposed quantity of mobile robots includes retrieving the predetermined working route based on the setting instruction, obtaining a route length of the predetermined working route based on the route coordinate sets, obtaining a total working time for the predetermined working route based on the predetermined robot speed and the route length, and generating the proposed quantity of mobile robots based on the predetermined robot speed, the setting information and a current time.

6. The method as claimed in claim 1, further comprising a step of
when it is determined that no abnormal notification has been received, repeating the determining-and-handling procedure.

7. A method for controlling a plurality of mobile robots, to be implemented by a server that communicates with the plurality of mobile robots and a communication device, the server storing a predetermined working route related to a target area, the method comprising steps of:
receiving a working instruction from the communication device, the working instruction including area information related to the target area and an input quantity of mobile robots;
in response to receipt of the working instruction, dividing the predetermined working route that is related to the target area into a plurality of sub-routes, wherein a quantity of the sub-routes equals the input quantity of mobile robots;
sending the sub-routes respectively to a plurality of selected robots selected from among the plurality of mobile robots to make the selected robots cooperatively implement a task on the target area by moving along the sub-routes, respectively; and
after sending the sub-routes respectively to the plurality of selected robots, implementing a determining-and-handling procedure,
wherein the determining-and-handling procedure includes steps of
receiving a plurality of working states respectively from the selected robots;
determining whether each of the working states indicates that the corresponding one of the selected robots has finished working along the corresponding one of the sub-routes;
when it is determined that each of the working states indicates that the corresponding one of the selected robots has finished working, sending to the communication device a notification indicating that all of the selected robots have finished working;
when it is determined that one of the working states does not indicate that the corresponding one of the selected robots has finished working, sending an abnormal-checking instruction to each of the selected robots to make the selected robot determine whether the selected robot is in an abnormal condition and send an abnormal notification indicating that the selected robot is in the abnormal condition to the server when it is determined that the selected robot is in the abnormal condition;
determining whether an abnormal notification is received from any one of the selected robots; and
when it is determined that an abnormal notification is received from one of the selected robots, executing an abnormal-handling sub-procedure,
wherein the abnormal-handling sub-procedure includes steps of
based on the abnormal notification thus received, generating an abnormal report indicating an abnormal one of the selected robots that is a source of the abnormal notification thus received, and then sending the abnormal report to the communication device;
receiving a working adjustment instruction from the communication device, the working adjustment instruction being generated by a user using the communication device with reference to the abnormal report; and
according to the working adjustment instruction, dispatching a portion of the mobile robots to complete the task on the target area,
wherein, in the step of receiving a working adjustment instruction, the working adjustment instruction indicates re-dividing an uncompleted portion of the predetermined working route that has not been passed by the selected robots; and
wherein the step of dispatching a portion of the mobile robots to complete the task includes re-dividing the uncompleted portion of the predetermined working route into a plurality of adjusted sub-routes according to the working adjustment instruction, sending the adjusted sub-routes respectively to the selected robots except the abnormal one of the selected robots, and repeating the determining-and-handling procedure for the selected robots except the abnormal one of the selected robots, a quantity of the adjusted sub-routes being equal to the input quantity of mobile robots minus one.

8. The method as claimed in claim 7, wherein when a plurality of abnormal notifications are received respectively from multiple ones of the selected robots, a quantity of the adjusted sub-routes being equal to the input quantity of mobile robots minus a number of the abnormal notifications thus received.

* * * * *